No. 695,682. Patented Mar. 18, 1902.
C. GLOVER.
VELOCIPEDE BEARING.
(Application filed May 1, 1900.)
(No Model.)
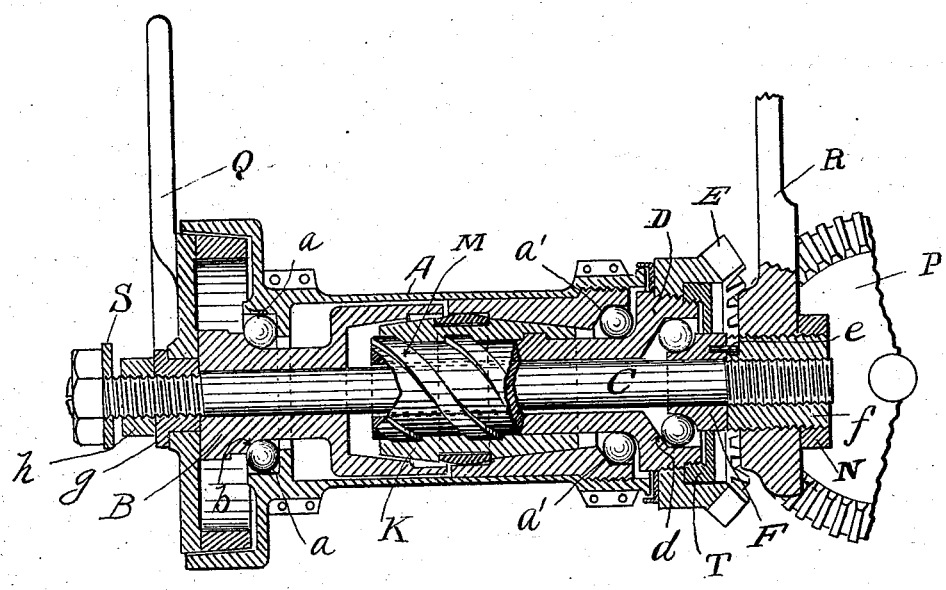
Witnesses
Inventor
Charles Glover
Attorneys

UNITED STATES PATENT OFFICE.

CHARLES GLOVER, OF NEW BRITAIN, CONNECTICUT.

VELOCIPEDE-BEARING.

SPECIFICATION forming part of Letters Patent No. 695,682, dated March 18, 1902.

Application filed May 1, 1900. Serial No. 15,044. (No model.)

*To all whom it may concern:*

Be it known that I, CHARLES GLOVER, a citizen of the United States, residing at New Britain, county of Hartford, and State of Connecticut, have invented certain new and useful Improvements in Velocipede-Bearings, of which the following is a full, clear, and exact description, whereby any one skilled in the art can make and use the same.

The object of my invention is to provide a bearing having features of novelty and advantage.

The single figure is a sectional view of a velocipede-hub, showing my invention embodied therein.

The bicycle-hub shown in the drawing is of the "free-running" type, in which there is provided an extra set of bearings, which allow the wheel to revolve while the pedals are stationary. The hub A is connected to the sleeve D, to which is attached the gear E by the sleeve K, which may be moved lengthwise of the axle by the spiral M on the sleeve D.

A denotes the hub-shell, and $a$ $a'$ denote the ball-cases in each end thereof; B, a sleeve mounted to slide on the axle C; $b$, a bearing-surface on the sleeve D, coacting with the case A.

D is a sleeve, to which the gear E is fastened, having on one side a bearing-surface $d$, which coacts with the cone F, mounted on the axle. This sleeve D also has a bearing-surface which coacts with the case $a'$ in the hub-shell. The cone F has a pin $e$, which engages a slot in the nut $f$. This nut $f$ is threaded into the frame R of the machine and is also interiorly threaded to receive the threaded end of the axle C. A lock-nut N secures the nut $f$ in position. At the opposite side of the hub is an adjusting-nut $g$, threaded onto the axle and engaging the end of the sliding cone $b$. Back of this adjusting-nut is the lock-nut $h$.

The parts of the wheel-hub—that is, the cones, the cases, and the antifrictional devices, &c.—are assembled before the wheel is put into the frame. This being done, the wheel is set into the frame and the gears are brought to their proper positions, so that they mesh and run together accurately, and the nut $f$ is screwed into the frame and up against the cone F. The lock-nut N is then screwed up against the frame to hold the nut $f$ from further movement inward. This determines the position of the gear E with relation to its coacting gear P and prevents them from being brought any closer together after they have been carefully adjusted. The pin $e$ in the cone, which engages the slot in the nut $f$, prevents any relative rotation of these parts with relation to each other. The sleeve or cone B is entirely independent of the cone F. They are both mounted to slide on the axle $c$. The bearings are adjusted by the nut $g$. By turning this nut to the right the cone B will be moved toward the cone F and, as is perfectly clear from the drawing, will tighten up the bearings. By turning the nut $g$ to the left the weight of the wheel on the bearings tends to throw the cones B F away from each other as far as possible, and the bearings will thus be loosened. It is clear, therefore, that the entire adjustment of the bearings of the wheel is controlled by the nut $g$, the lock-nut H being screwed up against the nut $g$ when the desired adjustment is obtained. If it were not for the fact that the cone F abuts against the nut $f$, the adjustment of the gears with relation to each other would be disturbed every time the bearings were adjusted; but by my construction the bearings may be adjusted as much as desired without in the least affecting the adjustment of the gears. This is not true of any chainless bicycle on the market and is a serious drawback to the ready and accurate adjustment of the gears and the bearings.

R and S represent the parts of the frame in which the rear wheel is secured.

To take the wheel out of the frame, it is only necessary to unscrew the axle C from the nut $f$ and withdraw it from the hub. The hub may now be withdrawn from the frame, the brake-disk Q closing one end of the hub and the cone F closing the other end, being held in place by the dust-cap T, and I am thus permitted to take the hub out of the frame without greatly disturbing the bearing parts, so that when the wheel is replaced in the frame they will assume their original positions.

The simplicity of the construction which allows me to accomplish the above-described results and the effectiveness of its operation are of great advantage over all other existing devices of the same kind.

I claim as my invention—

1. In a chainless bicycle of the free-running type, in combination, the rear forks of the frame, the wheel-hub having bearing-cases located in each end thereof, the driving-gear, the driven gear mounted on a sleeve independent of the hub and meshing with the driving-gear, the axle, independent cones slidingly mounted on the axle, and an abutment adjustably mounted in the rear forks of the frame and bearing against one of the sliding cones, and means operating against the other cone for moving the parts to adjust the bearings, substantially as described.

2. In a chainless bicycle of the free-running type in combination, the rear forks of the frame, the driving-gear, the wheel-hub, the driven gear meshing with said driving-gear, the axle, independent cones slidingly mounted on said axle, an abutment adjustably mounted in the rear forks of the frame and forming an abutment for one of said sliding cones, and a bushing screw-threaded onto the axle and bearing against the opposite cone and adapted by its movement to move the parts to effect the adjustment of the bearings.

3. In a chainless bicycle in combination the frame, the rotating side shaft, the rear gear secured to said side shaft, the wheel-hub, the driven gear mounted in operative relation thereto and meshing with the first-mentioned gear, and bearing-cases located in each end of said wheel-hub, a nut threaded into the frame of the machine and forming an abutment to determine and maintain the proper meshing of the gears, the axle threaded into said nut, a cone slidingly mounted on said axle, and abutting against said nut, a second cone slidingly mounted on the opposite end of said axle, and an adjusting-nut threaded onto the axle and adapted to move the last-mentioned cone to adjust the bearings, substantially as described.

4. In a chainless bicycle in combination the frame, the rotating side shaft, a gear fixedly secured thereto, the wheel-hub, the driven gear mounted in operative relation thereto and meshing with the driving-gear, bearing-cases located in each end of the hub, the axle and cones slidingly mounted on said axle and coacting with said bearing-cases, a nut threaded into the frame at the gear end of the hub and forming an abutment for one of the cones, the axle threaded into said nut, and an adjusting-nut at the opposite end of said axle adapted to move the parts to adjust the bearings, substantially as described and for the purposes set forth.

5. In combination in a chainless bicycle the rear forks of the frame, the driving-gear, the driven gear, the bearing-cases, the axle, cones mounted to slide on the axle, an abutment for the cone at the gear end of the hub adjustably mounted in the rear forks of the frame, and an adjusting-nut or bushing threaded onto the opposite end of the axle and adapted to move the parts to adjust the bearings.

6. In a device for adjusting the meshing of the gears, and the bearings in a chainless bicycle of the free-running type, in combination, the wheel-hub and bearing-cases for each end thereof, the sleeve upon which the gear is mounted, the bearing-surfaces on the outside of the sleeve adapted to coact with one of the cases, a sleeve slidingly mounted on the axle and having a bearing-surface coacting with the other bearing-cases, means for positively connecting the gear-sleeve with the hub or with the second sleeve, a cone slidingly mounted on the axle and cooperating with a bearing-surface on the under side of the gear-sleeve, an adjustable abutment for said cone and an adjusting-nut located at the opposite end of the axle, as and for the purposes specified.

Signed this 28th day of April, 1900, at New Britain, Connecticut.

CHARLES GLOVER.

Witnesses:
 M. C. NORTH,
 A. H. GAMERDINGER.